United States Patent
Yi

(10) Patent No.: US 11,850,966 B2
(45) Date of Patent: Dec. 26, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Jaeshin Yi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 533 days.

(21) Appl. No.: 16/952,636

(22) Filed: Nov. 19, 2020

(65) Prior Publication Data

US 2021/0300197 A1 Sep. 30, 2021

(30) Foreign Application Priority Data

Mar. 30, 2020 (KR) .................. 10-2020-0038631

(51) Int. Cl.
*B60L 53/62* (2019.01)
*B60L 58/12* (2019.01)
(Continued)

(52) U.S. Cl.
CPC ............... *B60L 53/62* (2019.02); *B60L 58/12* (2019.02); *B60L 58/26* (2019.02);
(Continued)

(58) Field of Classification Search
CPC .......... B60L 53/62; B60L 58/12; B60L 58/26; B60L 2240/545; B60L 2240/547; H01M 10/486; H01M 2220/20
See application file for complete search history.

(56) References Cited

U.S. PATENT DOCUMENTS 5,596,260 A * 1/1997 Moravec .............. G01R 31/367
324/426
10,093,191 B2 * 10/2018 Keller .................... B60L 53/14
(Continued)

FOREIGN PATENT DOCUMENTS

KR 10-2019-0083897 A 7/2019

*Primary Examiner* — Gertrude Arthur Jeanglaude
(74) *Attorney, Agent, or Firm* — Morgan, Lewis & Bockius LLP

(57) ABSTRACT

A system for estimating a charging time of a vehicle battery includes: a measuring device configured to measure a temperature and a voltage of the battery; an electrical behavior predictor configured to predict, when a charging current according to the measured temperature and voltage of the battery is applied to the battery, at least one of a terminal voltage of the battery after an amount of unit time has changed, a state of charge (SOC), or an amount of heat generated; a thermal behavior predictor configured to predict, when the charging current is applied to the battery, the temperature of the battery after the amount of unit time has changed over time of the battery and coolant using the amount of heat generated predicted by the electrical behavior predictor; and a controller configured to determine an estimated charging time of the vehicle based on at least one of the predicted terminal voltage, the SOC, the amount of heat generated, or the temperature of the battery after the amount of unit time has changed over time of the battery and the coolant.

14 Claims, 5 Drawing Sheets

(51) Int. Cl.
*B60L 58/26* (2019.01)
*H01M 10/48* (2006.01)

(52) U.S. Cl.
CPC ....... *H01M 10/486* (2013.01); *H01M 10/488* (2013.01); *B60L 2240/545* (2013.01); *B60L 2240/547* (2013.01); *H01M 2220/20* (2013.01)

(56) References Cited

U.S. PATENT DOCUMENTS

| | | | |
|---|---|---|---|
| 2015/0046108 A1* | 2/2015 | Akamine | H01M 10/48 702/63 |
| 2017/0210390 A1* | 7/2017 | Porras | B60K 6/40 |
| 2018/0079318 A1* | 3/2018 | Ha | B60L 53/66 |

\* cited by examiner

U.S. 11,850,966 B2

VEHICLE AND METHOD OF CONTROLLING THE SAME

CROSS-REFERENCE TO RELATED APPLICATION(S)

This application is based on and claims priority to Korean Patent Application No. 10-2020-0038631, filed on Mar. 30, 2020 in the Korean Intellectual Property Office, the disclosure of which is incorporated by reference in its entirety.

TECHNICAL FIELD

The present disclosure relates to a system and a method of controlling the same, and more particularly, to a system capable of accurately estimating a charging time of a vehicle battery based on prediction of a voltage and a temperature of the vehicle battery.

BACKGROUND

Recently, as a demand for eco-friendly vehicles increases, vehicles capable of driving based on electrical energy have been increasing, and technical research related to vehicles driving based on electrical energy has been also actively conducted.

One of important technologies related to the vehicle driving based on electrical energy is to improve a mileage. The mileage depends on a capacity of a high-voltage battery. In order to drive a vehicle for a relatively long distance with the electrical energy, a cooling system and a heating system are applied to increase the capacity and an energy density of the battery, and to prevent battery performance degradation and deterioration due to temperature. However, as a battery energy increases, a charging time also increases. In order to overcome this shortcoming, in the case of long-distance electric vehicles, a step charging method is used to change a charging current by temperature/voltage using characteristics of the battery that can be quickly charged in a state of charge (SOC).

However, the battery temperature and voltage vary depending on the charging current, and the battery temperature may change depending on the performance and control of the cooling/heating system. In addition, depending on the characteristics of the step charging method in which the charging current varies depending on the battery temperature/voltage, the charging current changes again, and as the charging current changes, the battery may be affected. That is, in the case of the step charging method, it is difficult to estimate the charging time because the charging current rapidly changes due to temperature changes and voltage changes during battery charging. In addition, there is a limitation in accurately estimating accurate charging time because the charging time may vary a lot even with the same charge amount according to an initial charge amount and a target charge amount of the battery.

On the other hand, a time taken to a step end voltage and a time taken to rise by 1° C. are used to estimate the charging time of step charging by referring to values previously stored in a database. Thus, it is inconvenience to create the database after performing a test for each charging condition.

SUMMARY

An aspect of the present disclosure is to provide a system that accurately determines an estimated charging time of a vehicle battery using voltage prediction and temperature prediction, and a method of controlling the same.

Additional aspects of the present disclosure will be set forth in part in the description which follows and, in part, will be obvious from the description, or may be learned by practice of the present disclosure.

In accordance with an aspect of the present disclosure, a system for estimating a charging time of a vehicle battery includes: a measuring device configured to measure, when a charging current according to the measured temperature or voltage of the battery is applied to the battery, a temperature and voltage of the battery; an electrical behavior predictor configured to predict at least one of a terminal voltage of the battery after an amount of unit time has changed, a state of charge (SOC), or an amount of heat generated; a thermal behavior predictor configured to predict, when the charging current is applied to the battery, the temperature of the battery after the amount of unit time has changed over time of the battery and coolant using the amount of heat generated predicted by the electrical behavior predictor; and a controller configured to determine an estimated charging time of the vehicle based on at least one of the predicted terminal voltage, the SOC, the amount of heat generated, or the temperature of the battery after the amount of unit time change over time of the battery and the coolant.

The electrical behavior predictor may be configured to predict at least one of the terminal voltage, the SOC, and the amount of heat generated using a maximum current and power of a charger of the battery.

The electrical behavior predictor may be configured to predict the terminal voltage using at least one of an electromotive force, which is an intrinsic voltage of the battery, an internal resistance of the battery, the charging current, a short-term polarization voltage of the battery, and a long-term polarization voltage of the battery.

The electrical behavior predictor may be configured to predict the amount of heat generated using at least one of the terminal voltage, the charging current, and the electromotive force.

The thermal behavior predictor may be configured to predict the temperature of the battery using a heat capacity and a heat transfer coefficient of the battery.

The thermal behavior predictor may be configured to predict the amount of temperature change over time of the battery and the coolant using a heat exchange relationship between the battery and the coolant.

The thermal behavior predictor may be configured to predict the amount of temperature change over time of the battery using at least one of the amount of heat generated of the battery predicted using the heat capacity and the heat transfer coefficient of the battery, the amount of heat exchanged with the coolant, and the amount of heat exchange due to convection of external air.

The thermal behavior predictor may be configured to predict the amount of temperature change over time of the coolant using the amount of heat exchanged with the coolant, an amount of heat supplied from a heater, and an amount of heat removed from a chiller.

The controller may be configured to accumulate a unit time until the time when an estimated charge amount of the battery reaches a target charge amount, and to determine the estimated charging time at the time when a charge amount of the battery reaches the target charge amount.

In accordance with another aspect of the present disclosure, a method of controlling a system estimating a charging time of a vehicle battery includes: measuring a temperature and voltage of a battery; predicting, when a charging current according to the measured temperature and voltage of the battery is applied to the battery, at least one of a terminal voltage of the battery after an amount of unit time has changed, a state of charge (SOC), or an amount of heat generated;

predicting the temperature of the battery after the amount of unit time has changed over time of the battery and coolant according to the charging current and the amount of heat generated; and determining an estimated charging time of the vehicle based on at least one of the predicted terminal voltage, the SOC, the amount of heat generated, or the temperature of the battery after the amount of unit time has changed over time.

The method may further include comparing a current charge amount and a target charge amount of the battery.

The method may further include identifying the charging current and a condition in which a power changes.

The method may further include predicting at least one of the terminal voltage, the SOC, and the amount of heat generated using a maximum current and power of a charger of the battery.

The method may further include predicting the terminal voltage using at least one of an electromotive force, which is an intrinsic voltage of the battery, an internal resistance of the battery, the charging current, a short-term polarization voltage of the battery, and a long-term polarization voltage of the battery.

The method may further include predicting the amount of heat generated using at least one of the terminal voltage, the charging current, and the electromotive force.

The method may further include predicting the amount of temperature change over time of the battery using a heat capacity and a heat transfer coefficient of the battery.

The method may further include predicting the amount of temperature change over time of the battery and the coolant using a heat exchange relationship between the battery and the coolant.

The method may further include predicting the amount of temperature change over time of the battery using at least one of the amount of heat generated of the battery predicted using the heat capacity and the heat transfer coefficient of the battery, the amount of heat exchanged with the coolant, and the amount of heat exchange due to convection of external air.

The method may further include predicting the amount of temperature change over time of the coolant using at least one of the amount of heat exchanged with the coolant, an amount of heat supplied from a heater, and an amount of heat removed from a chiller.

The determining of the estimated charging time may include accumulating a unit time until the time when an estimated charge amount of the battery reaches a target charge amount; and determining the estimated charging time at the time when a charge amount of the battery reaches the target charge amount.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
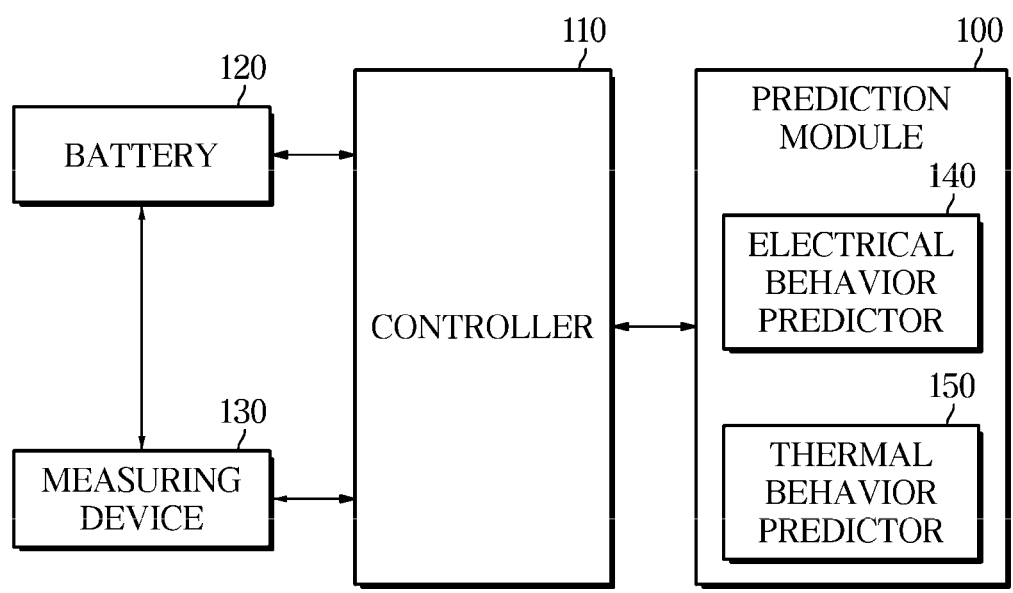
FIG. 1 is a control block diagram of a system according to an embodiment of the present disclosure.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present disclosure will be described with reference to accompanying drawings.

A vehicle disclosed in the present disclosure may be a hybrid vehicle, but is not limited thereto.

Hereinafter, embodiments of a vehicle and a method of controlling the vehicle according to aspects of the present disclosure are described in detail with reference to the accompanying drawings.

FIG. 1 is a control block diagram of a system according to an embodiment of the present disclosure.

Referring to FIG. 1, the vehicle may include a battery 120, a measuring device 130 for measuring a temperature and voltage of the battery 120, an electrical behavior predictor 140 for predicting at least one of a terminal voltage, a state of charge (SOC), or an amount of heat generated when a charging current according to the measured temperature and voltage of the battery 120 is applied to the battery 120, a thermal behavior predictor 150 for predicting an amount of temperature change of the battery 120 according to an amount of charging time change of the battery 120 and coolant using the amount of generated heat predicted by the electrical behavior predictor 140, and a controller 110 that determines the estimated charging time of the vehicle battery based on at least one of the terminal voltage, the SOC, the amount of heat predicted by the electrical behavior predictor 140, or the amount of temperature change of the battery 120 according to the amount of charging time change and the coolant.

The prediction module 100 may include the electrical behavior predictor 140 and the thermal behavior predictor 150. In the present disclosure, the prediction module 100 may be a processor such as a CPU or controller, or the prediction module 100 may be integrated with the controller 110.

The controller 110 may control a cooling fan or a heating system to maintain an optimum battery operating temperature, and may diagnose a battery failure through detection of overvoltage, overcurrent, and overtemperature.

The controller 110 may change the charging current and power used by the electrical behavior predictor 140 and the thermal behavior predictor 150 when the SOC, the voltage, and the temperature after a unit time reach a condition in which the charging current and the power are changed.

The electrical behavior predictor 140 and the thermal behavior predictor 150 may newly predict at least one of the terminal voltage, the SOC, the amount of heat, and the amount of temperature change using a mutual prediction result.

The controller 110 may be implemented with a memory storing an algorithm to control operation of the components in the vehicle or data about a program that implements the algorithm, and a processor carrying out the aforementioned operation using the data stored in the memory. The memory and the processor may be implemented in separate chips. Alternatively, the memory and the processor may be implemented in a single chip. In the present disclosure, the controller 110 may control the prediction module 100 and the measuring device 130 as a separate device, or the prediction module 100 and the measuring device 130 may be embedded in the controller 110 as one device.

The battery 120 is a device that supplies power to a plurality of devices provided in the vehicle. The battery 120 may include a high-voltage battery or a low-voltage battery.

The high-voltage battery may be a battery applied to driving the vehicle, and the low-voltage battery may be a battery applicable to vehicle accessories such as radio, air conditioner, navigation, etc., but is not limited thereto.

In addition, the system may further include a battery controller (not shown) as a BMS (Battery Management System) that optimizes a management of the battery 120 to increase energy efficiency and extend its lifespan. The battery controller may improve battery safety and reliability by monitoring the battery voltage, current and/or temperature in real time and preventing excessive charging and discharging in advance. The battery controller may be configured in the battery 120.

The measuring device 130 may include a battery sensor, and may detect an internal resistance, an accumulated discharge amount, a discharge order, a discharge time, or an average discharge current of the battery 120. In addition, a sensor included in the measuring device 130 is not limited to the battery sensor, and may include other components capable of measuring the SOC, a state of performance, or a state of discharge of the battery 120.

A charger may provide the charging current to the battery 120. A level of the charging current provided from a charger (not shown) may be controlled by the controller 110.

The charging current provided from the charger by the controller 110 may be provided to the battery 120 to charge a plurality of cells, respectively, and as the plurality of cells are charged, the SOC increases and the voltage also increases.

Figure 2:
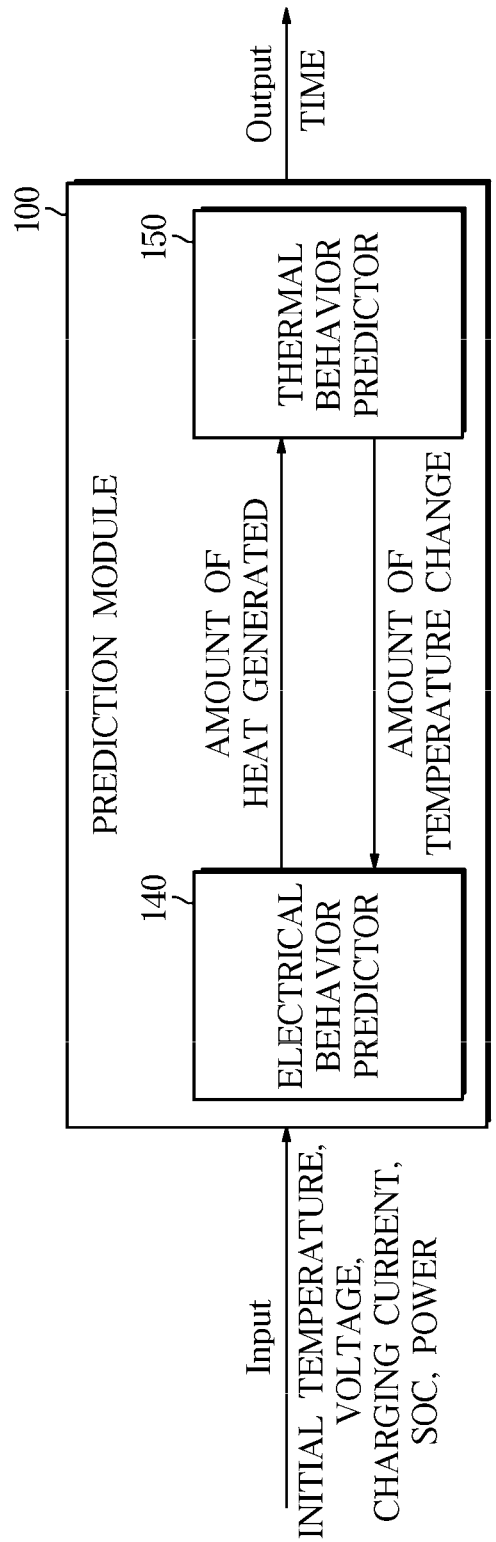
FIG. 2 is a control block diagram of a prediction module according to an embodiment of the present disclosure.

FIG. 2 is a control block diagram of a prediction module according to an embodiment of the present disclosure.

Referring to FIG. 2, the prediction module 100 may include the electrical behavior predictor 140 and the thermal behavior predictor 150.

The prediction module 100 may receive the temperature and voltage of the battery 120 from the measuring device 130, and may receive the charging current, the SOC and the power of the battery 120 from the BMS.

The prediction module 220 may receive charging current conditions according to the received temperature and voltage of the battery 120 from a charging map and a charging strategy stored in the memory.

Here, the conditions may include changing the charging current and a power change temperature when the voltage rises, the charging current and the power change temperature when the SOC rises, the charging current and the power change temperature when the temperature rises, the charging current and the power change temperature when the temperature falls, and a heater operating condition change temperature, and an operating condition change temperature of a chiller 252 (see FIG. 4), but is not limited thereto.

When the charging current changed based on the received condition is applied to the battery 120, the electrical behavior predictor 140 may predict at least one of the terminal voltage of the battery 120, the SOC, and the amount of heat.

The electrical behavior predictor 140 may predict the terminal voltage using at least one of an electromotive force, which is an intrinsic voltage of the battery 120, an internal resistance of the battery 120, the charging current of the battery 120, a short-term polarization voltage, or a long-term polarization voltage.

The electrical behavior predictor 140 may predict the amount of heat using at least one of the predicted terminal voltage, the charging current, or the electromotive force.

The thermal behavior predictor 150 may predict the amount of temperature change of the battery 120 over time using the heat capacity and heat transfer coefficient of the battery 120.

The thermal behavior predictor 150 may predict the amount of temperature change of the battery 120 according to time and the coolant using a heat exchange relationship between the battery 120 and the coolant.

The thermal behavior predictor 150 may predict the amount of temperature change over time of the battery 120 using at least one of the amount of heat generated by the battery 120, the amount of heat exchanged between the battery 120 and the coolant, or the amount of heat exchanged due to convection of external air.

Figure 4:
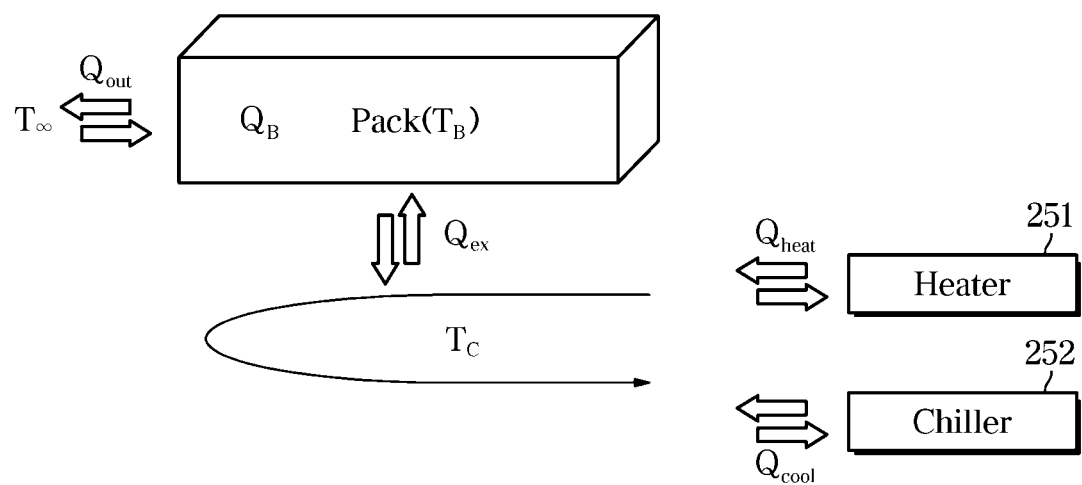
FIG. 4 is a view illustrating a configuration of a thermal behavior predictor according to an embodiment of the present disclosure.

The thermal behavior predictor 150 may predict the amount of temperature change over time of the coolant using at least one of the amount of heat exchanged between the battery 120 and the coolant, an amount of heat supplied from a heater 251, or an amount of heat removed from the chiller 252 (see FIG. 4).

The amount of heat removed by the chiller 252 may refer to the amount of heat removed by the coolant in the chiller 252.

The thermal behavior predictor 150 may predict the amount of temperature change over time of the battery 120 and the coolant using the amount of heat predicted by the electrical behavior predictor 140.

In addition, the electrical behavior predictor 140 may newly predict the amount of heat generated by the battery 120 using the predicted amount of temperature change, and the thermal behavior predictor 150 may predict the amount of temperature change using the newly predicted amount of heat.

The prediction module 100 may predict the amount of temperature change according to the amount of time change for charging the battery 120 through the electrical behavior predictor 140 and the thermal behavior predictor 150.

Figure 3:
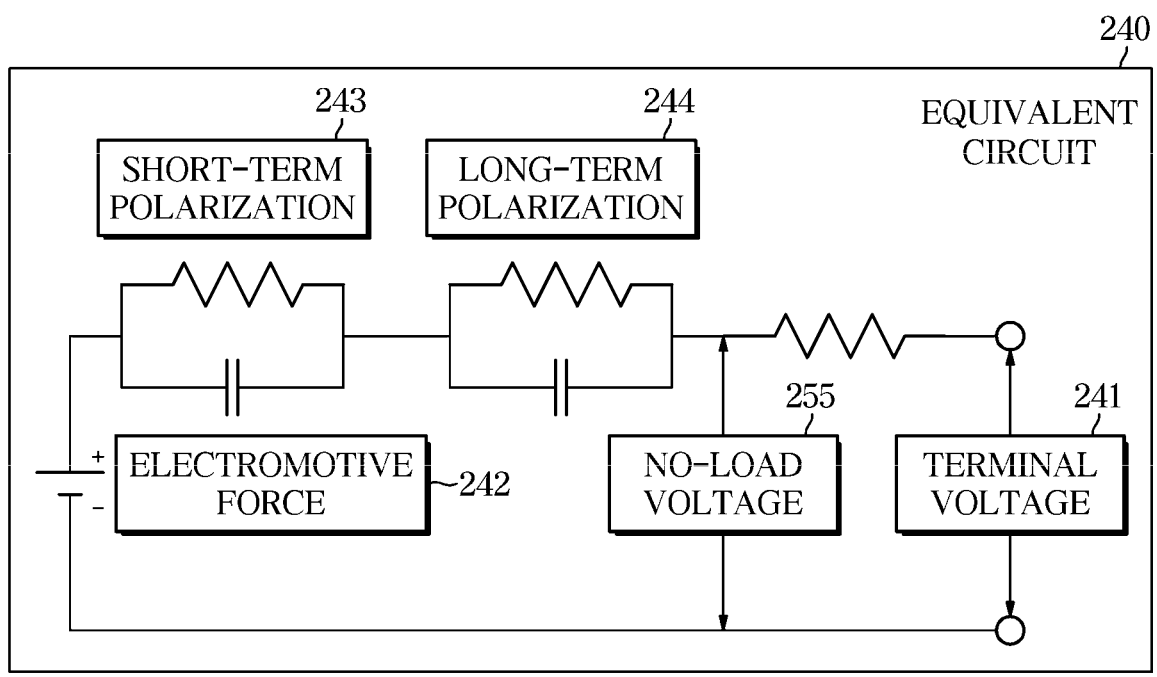
FIG. 3 is a view illustrating an equivalent circuit of an electrical behavior predictor according to an embodiment of the present disclosure.

FIG. 3 is a view illustrating an equivalent circuit of an electrical behavior predictor according to an embodiment of the present disclosure.

Referring to FIG. 3, the electrical behavior predictor 140 uses the electrical characteristics of the battery 120, and may predict a terminal voltage 241, the amount of heat generated using the relationship between an electromotive force 242, which is the intrinsic voltage of the battery 120, and the polarization voltages generated by an internal resistance of the battery 120 and the charging current.

The electromotive force 242, which is the intrinsic voltage of the battery 120, may have a specific electromotive force value for a specific SOC.

The terminal voltage 241 may be predicted using the electromotive force 242, the internal resistance of the battery 120, the charging current, a voltage of a long-term polarization 244, and a voltage of a short-term polarization 243.

The voltages of the polarizations 243 and 244 may be an amount of change in voltage other than the electromotive force 242 when the charging current is applied.

The voltage of the short-term polarization 243 may be a voltage component that disappears within a relatively short time, and the voltage of the long-term polarization 244 may be a voltage component that takes a longer time to disappear.

The terminal voltage 241 may be predicted by adding all of the electromotive force 242, the voltage of the short-term polarization 243, and the voltage of the long-term polarization 244, and additionally adding a voltage value obtained by multiplying the internal resistance and the charging current.

With reference to Equation 1 below, the amount of heat generated $Q_B$ may be predicted.

$$Q_B \cdot Q_B = I \times (E_{oc} - V) \qquad \text{[Equation 1]}$$

Here, I may be the charging current, $E_{oc}$ may be the electromotive force 242, and V may be the terminal voltage 241.

The electrical behavior predictor 140 may use an equivalent circuit 240.

FIG. 4 is a view illustrating a configuration of a thermal behavior predictor according to an embodiment of the present disclosure.

Referring to FIG. 4, assuming that the battery 120 is one thermal mass and the coolant is another thermal mass, the thermal behavior predictor 150 may predict the amount of temperature change over time of the battery 120 and the coolant by calculating heat exchange between the battery 120 and the coolant.

It is obvious to one of ordinary skill in the art how to predict the amount of temperature change over time of the coolant by calculating the amount of heat exchange between the coolant and the battery 120.

For instance, the heat exchange between the battery 120 and the coolant may be calculated by recognizing the change in a flow rate of the coolant.

The calculation of heat exchange between the battery 120 and the coolant may be performed in the BMS, but is not limited thereto.

First, the amount of temperature change according to the amount of time change of the battery 120 and the coolant may be predicted using Equations 2, 3, and 4 below.

Referring to Equation 2 below, an amount of heat exchange $Q_{ex}$ between the battery 120 and the coolant may be predicted.

$$Q_{ex} \cdot Q_{ex} = U \times A_{ex} \times (T_B - T_C) \qquad \text{[Equation 2]}$$

Here, U may be different according to a total heat transfer coefficient, coolant flow rate, and temperature difference between the battery 120 and the coolant. $A_{ex}$ may be a heat transfer area between the battery 120 and the coolant, $T_B$ may be the temperature of the battery 120, and $T_C$ may be the temperature of the coolant.

Referring to Equation 3 below, the amount of heat exchange $Q_\infty$ due to convection between the battery 120 and the external air may be predicted.

$$Q_\infty = h \times A_B \times (T_B - T_\infty) \qquad \text{[Equation 3]}$$

Here, h may be the heat transfer coefficient due to convection between the battery 120 and the external air, and $A_B$ may be the heat transfer area due to convection between the battery 120 and the external air.

Referring to Equation 4 below, in the amount of heat generated $Q_B$ predicted by the electrical behavior predictor 140, by calculating the difference between the amount of heat exchange $Q_{ex}$ between the battery 120 and the coolant and the amount of heat exchange $Q_\infty$ due to convection between the battery 120 and the external air, the amount of temperature change over time of the battery 120 may be predicted.

$$Q_B - Q_{ex} - Q_\infty = M_B C_B \frac{dT_B}{dt} \qquad \text{[Equation 4]}$$

Here, $M_B$ may be a mass of the battery 120, and $C_B$ may be a heat capacity of the battery 120.

Next, the amount of temperature change over time of the coolant may be predicted using Equation 5 below.

A heat $Q_{heat}$ supplied from the heater 251 may be predicted by multiplying a power consumption of the heater 251 and the efficiency of the heater 251.

A heat $Q_{cool}$ removed from the chiller 252 may be predicted by multiplying a power consumption of the chiller 252 and the efficiency of the chiller 252.

Referring to Equation 5 below, the amount of temperature change over time of the coolant by adding the amount of heat exchange $Q_{ex}$ between the battery 120 and the coolant, the heat $Q_{heat}$ supplied from the heater 251 and the heat $Q_{cool}$ removed from the chiller 252.

$$Q_{ex} + Q_{heat} + Q_{cool} = M_c C_c \frac{dT_c}{dt} \qquad \text{[Equation 5]}$$

Here, $M_c$ may be the mass of the coolant, and $C_c$ may be the heat capacity of the coolant.

Figure 5:
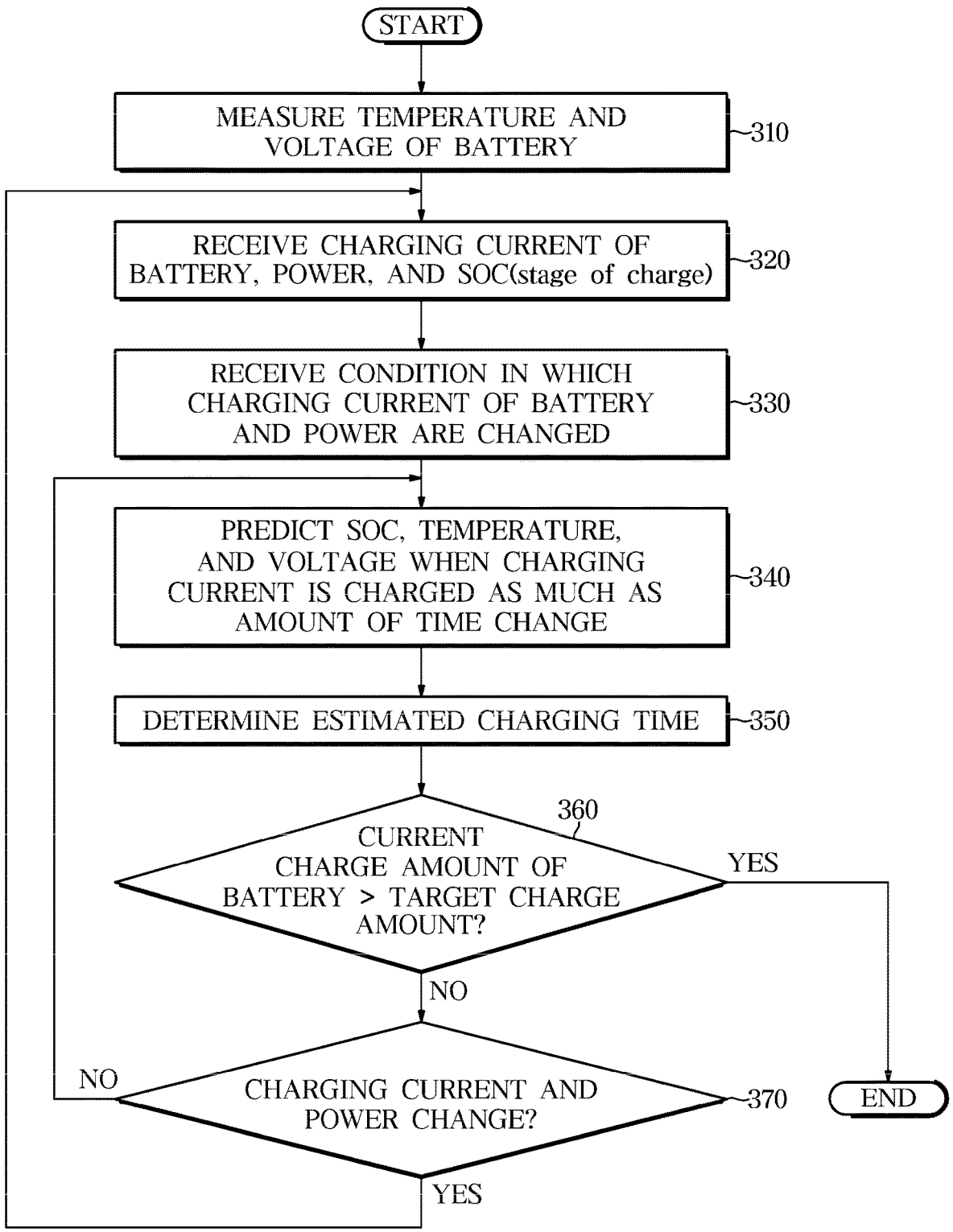
FIG. 5 is a view illustrating a prediction method of a prediction module according to an embodiment of the present disclosure.

FIG. 5 is a view illustrating a prediction method of a prediction module according to an embodiment of the present disclosure.

The measuring device 130 may measure a current temperature and a voltage of the battery 120 (310).

The prediction module 100 may receive a charging current, a power, and an SOC of the battery 120 from the BMS (320).

The prediction module 100 may receive a condition, in which the charging current and the power of the battery 120 are changed, from a charging map and a charging strategy stored in the memory (330).

The prediction module 100 may predict the amount of temperature change over time of the battery 120 charged with the changed charging current according to the received condition (340).

The electrical behavior predictor 140 may predict the terminal voltage, the SOC, and the amount of heat generated.

Using the predicted amount of heat generated, the thermal behavior predictor 150 may predict the amount of temperature change over time of the battery 120 and the coolant.

The controller 110 may determine the estimated charging time by adding the amount of time change of the prediction module 100 to the existing estimated charging time (350).

The controller 110 may compare a current charge amount of the battery 120 and a target charge amount of the battery 120 based on the determined estimated charging time (360).

When the current charge amount of the battery 120 is less than or equal to the target charge amount, the controller 110 may compare the condition in which the charging current and power of the battery 120 are changed with the current charging current and power of the battery 120 (S370).

If the above conditions are met, the prediction module 220 may repeat the processes to newly receive the charging current, the power, and the SOC of the battery 120 from the charging map and the charging strategy stored in the memory (320).

If the above conditions are not met, the prediction module 100 may predict the terminal voltage of the battery 120 after the amount of unit time change, the SOC, the amount of heat generated, and the amount of temperature change according to the amount of time change of the battery 120 and the chiller 252 using the existing charging current and power (340).

More particularly, since the amount of heat predicted by the electrical behavior predictor 140 is used for temperature prediction and the predicted temperature is used again in the electrical behavior predictor 140, the calculation may be performed repeatedly by reflecting the predicted result in the electrical behavior predictor 140 and the thermal behavior predictor 150 until the amount of temperature change during the unit time converges to a predetermined level or less.

By continuously accumulating the unit time, the total charging time taken until reaching the target charge amount may be predicted (350).

When the current battery charge amount becomes larger than the target charge amount (S360), the controller 110 may terminate the process.

When the current battery charge amount has not reached the target charge amount, the controller 110 may repeatedly perform the calculation until the temperature change amount during the unit time converges to the predetermined level or less.

When the current battery charge amount has not reached the target charge amount, but satisfies the condition in which the charging current and the charging power are changed, the charging current used by the electrical behavior predictor 140 and the thermal behavior predictor 150 may be changed into a changed current and power (370).

Here, the conditions may include the charging current and the power change temperature when the voltage rises, the charging current and the power change temperature when the SOC rises, the charging current and the power change temperature when the temperature rises, the charging current and the power change temperature when the temperature falls, and the heater operating condition change temperature, and the operating condition change temperature of the chiller 252, but is not limited thereto.

According to the embodiments of the present disclosure, the charging current and the charging state are changed due to critical conditions of the temperature and voltage of the vehicle battery. In response to various environmental changes of the vehicle, it is possible to accurately predict the estimated charging time of the vehicle battery.

In addition, it is possible to reduce inconvenience by predicting the estimated charging time without performing a test for each charging condition to create a database.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the present disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A system for estimating a charging time of a vehicle battery, the system comprising:
   a measuring device configured to measure a temperature and a voltage of the battery;
   an electrical behavior predictor configured to, when a charging current according to the temperature and the voltage of the battery is applied to the battery, predict at least one of a terminal voltage of the battery after an amount of unit time has changed, a state of charge (SOC), or an amount of heat generated;
   a thermal behavior predictor configured to predict, when the charging current is applied to the battery, the temperature of the battery after the amount of unit time has changed over time of the battery and coolant using the amount of heat generated predicted by the electrical behavior predictor; and
   a controller configured to determine an estimated charging time of the battery based on at least one of the predicted terminal voltage, the SOC, the amount of heat generated, and the temperature of the battery after the amount of unit time has changed over time of the battery and the coolant, wherein the electrical behavior predictor is further configured to predict the terminal voltage using at least one of an electromotive force, which is an intrinsic voltage of the battery, an internal resistance of the battery, the charging current, a short-term polarization voltage of the battery, or a long-term polarization voltage of the battery, wherein the electrical behavior predictor is further configured to predict the amount of heat generated using at least one of the terminal voltage, the charging current, or the electromotive force, and wherein the thermal behavior predictor is further configured to predict the temperature of the battery using a heat capacity and a heat transfer coefficient of the battery.

2. The system according to claim 1, wherein the electrical behavior predictor is configured to predict at least one of the terminal voltage, the SOC, or the amount of heat generated using a maximum current and a maximum power of the battery.

3. The system according to claim 1, wherein the thermal behavior predictor is configured to predict the amount of temperature change over time of the battery and the coolant using a heat exchange relationship between the battery and the coolant.

4. The system according to claim 1, wherein the thermal behavior predictor is configured to predict the amount of temperature change over time of the battery using at least one of the amount of heat generated of the battery predicted using the heat capacity and the heat transfer coefficient of the battery, the amount of heat exchanged with the coolant, or the amount of heat exchange due to convection of external air.

5. The system according to claim 3, wherein the thermal behavior predictor is configured to predict the amount of temperature change over time of the coolant using the amount of heat exchanged with the coolant, an amount of heat supplied from a heater, and an amount of heat removed from a chiller.

6. The system according to claim 1, wherein the controller is configured to:
accumulate the unit time until an estimated charge amount of the battery reaches a target charge amount, and
determine the estimated charging time when a charge amount of the battery reaches the target charge amount.

7. A method of controlling a system for estimating a charging time of a vehicle battery, the method comprising:
measuring a temperature and voltage of the battery;
predicting, when a charging current according to the measured temperature and voltage of the battery is applied to the battery, at least one of a terminal voltage of the battery after an amount of unit time has changed, a state of charge (SOC), or an amount of heat generated;
predicting the temperature of the battery after the amount of unit time has changed over time of the battery and coolant according to the charging current and the amount of heat generated;
determining an estimated charging time of the vehicle based on at least one of the predicted terminal voltage, the SOC, the amount of heat generated, or the temperature of the battery after the amount of unit time has changed over time;
predicting the terminal voltage using at least one of an electromotive force, which is an intrinsic voltage of the battery, an internal resistance of the battery, the charging current, a short-term polarization voltage of the battery, or a long-term polarization voltage of the battery,
predicting the amount of heat generated using at least one of the terminal voltage, the charging current, or the electromotive force; and
predicting the amount of temperature change over time of the battery using a heat capacity and a heat transfer coefficient of the battery.

8. The method according to claim 7, further comprising comparing a current charge amount and a target charge amount of the battery.

9. The method according to claim 7, further comprising identifying the charging current and a condition in which a power changes.

10. The method according to claim 7, further comprising predicting at least one of the terminal voltage, the SOC, or the amount of heat generated using a maximum current and a maximum power of the battery.

11. The method according to claim 7, further comprising predicting the amount of temperature change over time of the battery and the coolant using a heat exchange relationship between the battery and the coolant.

12. The method according to claim 7, further comprising predicting the amount of temperature change over time of the battery using at least one of the amount of heat generated of the battery predicted using the heat capacity and the heat transfer coefficient of the battery, the amount of heat exchanged with the coolant, or the amount of heat exchange due to convection of external air.

13. The method according to claim 11, further comprising predicting the amount of temperature change over time of the coolant using at least one of the amount of heat exchanged with the coolant, an amount of heat supplied from a heater, or an amount of heat removed from a chiller.

14. The method according to claim 7, wherein the determining an estimated charging time comprises:
accumulating the unit time until an estimated charge amount of the battery reaches a target charge amount; and
determining the estimated charging time when a charge amount of the battery reaches the target charge amount.

* * * * *